Feb. 6, 1951  F. H. WAGGONER  2,540,500

FRUIT JUICER WITH CONICAL REAMER

Filed July 15, 1949

INVENTOR.
Frank H. Waggoner
BY
Clarence G. Campbell
his attorney.

Patented Feb. 6, 1951

2,540,500

UNITED STATES PATENT OFFICE 2,540,500

FRUIT JUICER WITH CONICAL REAMER

Frank H. Waggoner, Ramsey, N. J.

Application July 15, 1949, Serial No. 105,029

5 Claims. (Cl. 146—3)

My invention relates to an improvement in a fruit juicer and its novelty consists in the combination and arrangement of parts as will be more fully hereinafter pointed out.

There have been many attempts to provide an efficient hand fruit juicer but none of them meet the requirements as they all ream out the fruit pulp as well as the juice so that not only the juice of the fruit but also the fruit pulp are collected in the base of the fruit juicer, or in the receptacle thereunder so that the juice has to be strained thereafter.

My device for the first time not only extracts all of the juices from the fruit perfectly but does so without taking any of the pulp of the fruit so that it is ready for immediate use and does not require straining.

The object of my fruit juicer is to extract all of the juice from a lemon or an orange without reaming out any of the fruit pulp.

Another object of my invention is to secure all of the juice from the lemon or orange so that it can be used immediately without the necessity of straining the juice.

Referring to the drawings.

Figure 1:
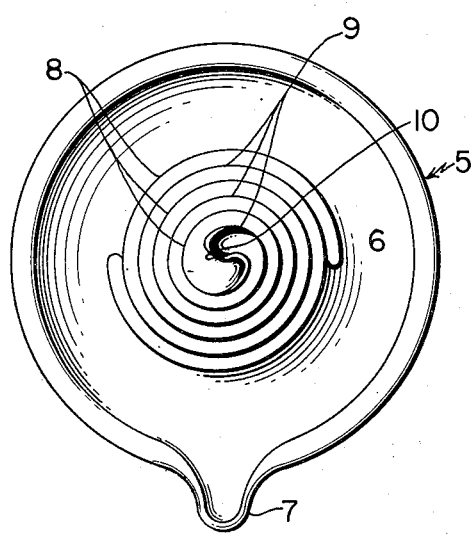
Fig. 1 is a top plan view of one form of my device.
Figure 2:
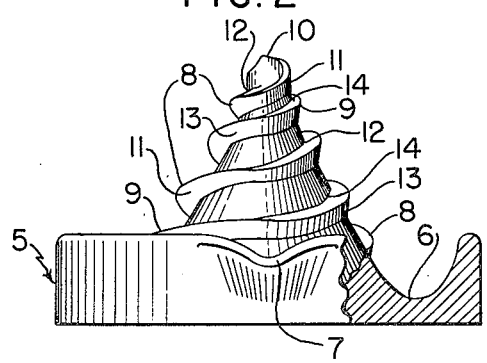
Fig. 2 is a side elevation of the same with a portion broken away to show the inner structure of the same.

In the drawings, of Figs. 1 and 2, 5 is a fruit juicer having a circular base trough 6 which has a pouring lip 7 and a continuous spiral conical central portion composed of an inner spiral 8 and an outer continuous spiral 9 forming widening circles toward the bottom. At the upper end of both spiral 8 and 9 where they join is a sharp pointed cutting edge 10. Spiral 8 has an undercut sloping side 11 and a top inner edge continuous gutter 12. Spiral 9 has an undercut sloping side 13 and a top inner edge continuous gutter 14. Both 8 and 9 have abrupt outer edges which effectively break the fruit cells and free the juice.

As the fruit juicer 5 is used a half lemon, for example, is pressed down with the cut side down on the pointed cutting edge 10 to pierce the lemon a slight distance and the lemon is then turned by hand clockwise and the descending continuous spirals 8 and 9 enter the lemon in widening circles with every turn of the lemon so that the pulp is turned back against the inside of the lemon and the juice extracted and rolls down the continuous gutters 12 and 14 and the mere turning of the half lemon causes the lemon to constantly engage the successively lower widening continuous spirals 8 and 9 pushing the flowing juice ahead of the constantly lowering half lemon until the bottom is reached and all of the lemon juice is collected in the trough 6 and can then be poured out of the lip 7 into whatever it is being used for as it is clear juice free of any pulp which is pushed back around the inside of the dejuiced half lemon rind.

Figure 3:
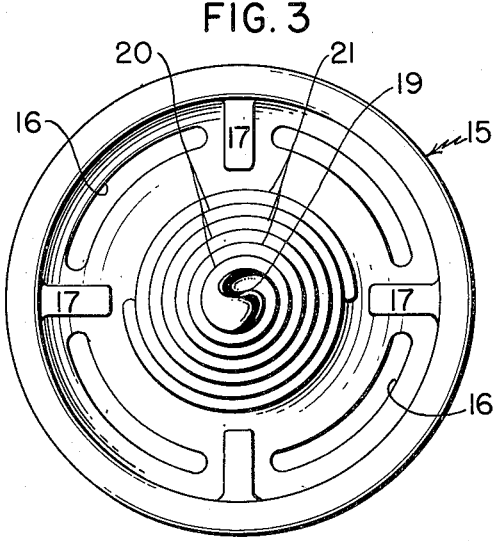
Fig. 3 is a top plan view of a second embodiment of my device.
Figure 4:
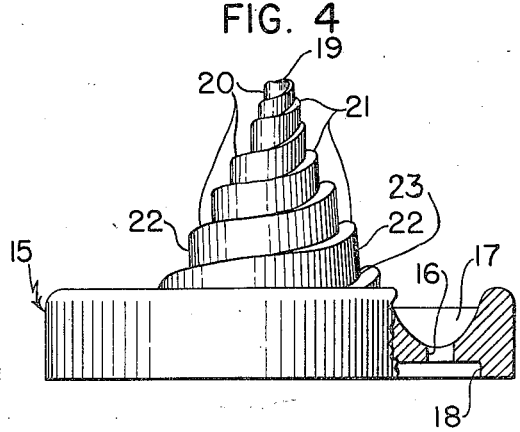
Fig. 4 is a side elevation of Fig. 3 with a portion broken away to show the inside construction.

The alternative form of my fruit juicer in Figs. 3 and 4 is 15 and has open slots 16 and ribs 17 to connect the outer and inner portions and a lip 18 is formed around the bottom inner edge of 15 to engage a tumbler or receptacle to catch the fruit juice as it is extracted from the lemon and runs down ahead of the descending lemon into the open slots 16.

The central continuous spiral conical portion of 15 differs from that of 5 in Figs. 1 and 2 in that it has a top cutting edge 19 from the inside of which continuous spiral 20 descends and from the outer side of 19 spiral 21 descends both 20 and 21 terminating in the open slots 16.

The sides 22 of both the continuous spirals 20 and 21 are vertical and the continuous spirals 20 have inner edge continuous gutters 23 and the continuous spirals 21 have inner edge continuous gutters 24 and both inner continuous edge gutters 23 and 24 run into the open slots 16 and thence into the receptacle placed thereunder so that the lip 18 around the inner under edge of the bottom of the juicer 15 registers thereon. Both 20 and 21 have abrupt outer edges which continuously cut the fruit cells permitting the fruit juice to run down.

Many variations may be made in the structure of my device without departing from the spirit and intent of the same as herein described, illustrated and claimed.

I claim:

1. A unitary fruit juicer comprising a base having a juice trough and pouring lip, a conical spiral portion in the center integral therewith and having a cutting edge at its upper end and two continuous spiral elements projecting from the sides of said conical portion descending in widening circles from said cutting edge and both of said spirals having continuous gutters at the inner edges of their upper sides and an abrupt portion continuously along said outer edges.

2. In a unitary fruit juicer, the combination of a base, a conical spiral portion integral with said base and having a cutting edge at its upper end, two continuous spiral elements projecting from the side walls of said conical portion and descending from said cutting edge in widening circles and each of said spiral elements having continuous gutters leading into said base and continuous abrupt outer edges.

3. In a unitary fruit juicer, the combination of a base, a conical spiral element having a cutting edge at its upper end, two continuous spiral elements descending from said cutting edge around said conical element with abrupt outer edges and continuous gutters on the inner edge of the upper sides of said spiral elements terminating at the bottom in said base.

4. In a unitary fruit juicer, the combination of a conical spiral element having an upper cutting edge, a spiral projection running continuously downward in widening circles from the inner side of said cutting edge around said conical element and a second spiral running continuously downward in widening circles from the outer side of said cutting edge, continuous gutters on the inner top edges of each of said spirals and both of said spirals having abrupt outer edges and said spirals terminating in the bottom portion of said juicer.

5. A unitary fruit juicer comprising a base adapted to fit over a receptacle and having open circular slots, a conical element integral with the center of said base having a cutting edge at its peak and an inner and outer continuous spiral element running down therefrom in widening circles around said conical element, each of said spirals having continuous gutters at their inner edges and abrupt outer edges emptying at their lower ends into said open circular slots.

FRANK H. WAGGONER.

REFERENCES CITED

The following references are of record in the file of this patent:

UNITED STATES PATENTS

| Number | Name | Date |
| --- | --- | --- |
| D. 27,948 | Blake | Dec. 7, 1897 |
| 343,754 | Bradley | June 15, 1886 |
| 369,711 | Hudson | Sept. 13, 1887 |
| 654,593 | Baumgarten | July 31, 1900 |
| 703,517 | Baumgarten | July 1, 1902 |
| 1,411,813 | Stein | Apr. 4, 1922 |
| 2,345,731 | Coyle | Apr. 4, 1944 |

FOREIGN PATENTS

| Number | Country | Date |
| --- | --- | --- |
| 32,483 | Germany | Aug. 10, 1885 |